United States Patent
Peng et al.

(10) Patent No.: US 8,654,080 B2
(45) Date of Patent: Feb. 18, 2014

(54) KEYBOARD AND ELECTRONIC DEVICE USING SAME

(75) Inventors: Zheng-Quan Peng, Shenzhen (CN); Hai-Qing Zhou, Shenzhen (CN)

(73) Assignees: Hong Fu Jin Industry (Shenzhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 313 days.

(21) Appl. No.: 13/152,289

(22) Filed: Jun. 3, 2011

(65) Prior Publication Data

US 2012/0268377 A1    Oct. 25, 2012

(30) Foreign Application Priority Data

Apr. 22, 2011 (CN) .......................... 2011 1 0101751

(51) Int. Cl.
    *G06F 3/02* (2006.01)
(52) U.S. Cl.
    USPC ......................................... 345/168
(58) Field of Classification Search
    USPC ............ 345/168–172; 341/22–34; 439/48, 54
    See application file for complete search history.

(56) References Cited

U.S. PATENT DOCUMENTS

| | | | | |
|---|---|---|---|---|
| 5,761,527 A * | 6/1998 | Clohset et al. | ..................... | 710/1 |
| 5,802,391 A * | 9/1998 | Hwang | .............. | 710/2 |
| 6,310,781 B1 * | 10/2001 | Karam | ......................... | 361/764 |
| 6,919,878 B2 * | 7/2005 | Wang | ............................. | 345/163 |
| 7,133,028 B2 * | 11/2006 | Smith | ........................... | 345/168 |
| 7,306,466 B2 * | 12/2007 | Reznik et al. | ................... | 439/55 |
| 2001/0009415 A1 * | 7/2001 | Liu | ................................. | 345/168 |
| 2001/0015722 A1 * | 8/2001 | Blencowe | ..................... | 345/170 |
| 2004/0102917 A1 * | 5/2004 | Chen et al. | ..................... | 702/120 |
| 2005/0005040 A1 * | 1/2005 | Chao | ................................ | 710/62 |
| 2005/0215081 A1 * | 9/2005 | Bench et al. | ................... | 439/54 |
| 2006/0148320 A1 * | 7/2006 | Yang et al. | ..................... | 439/608 |
| 2006/0152381 A1 * | 7/2006 | Yang et al. | ..................... | 340/687 |

OTHER PUBLICATIONS

Calex, "Understanding Power Impedance Supply for Optimum Decoupling," Application Note 3, Calex, Published Apr. 2001.*

* cited by examiner

*Primary Examiner* — Alexander Eisen
*Assistant Examiner* — Sanjiv D Patel
(74) *Attorney, Agent, or Firm* — Altis Law Group, Inc.

(57) ABSTRACT

A keyboard for an electronic device includes a main body, a test indicator positioned on an outside surface of the main body, and an interface electrically connected to both the main body and the test indicator. Both the main body and the test indicator are electrically connected to a main board of an electronic device through the interface. The electronic device can be operated using the keyboard, and the test indicator indicates the working status of the electronic device.

14 Claims, 5 Drawing Sheets

10# KEYBOARD AND ELECTRONIC DEVICE USING SAME

BACKGROUND

1. Technical Field

The present disclosure relates to keyboards for electronic devices, and particularly to a keyboard that is capable of indicating the working status of an electronic device using the same.

2. Description of Related Art

In quality tests for electronic devices, such as personal computers (PC), the working status of an electronic device is generally indicated by indicator lights positioned on the electronic device. However, in many quality test processes, the electronic devices need to be enclosed in a sealed space (e.g., a testing box), so that dust, vapor, and electromagnetic waves are prevented from interfering with the quality tests. When an electronic device is enclosed in a testing box, it is difficult to detect the indicator lights to determine the working status of the electronic device.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
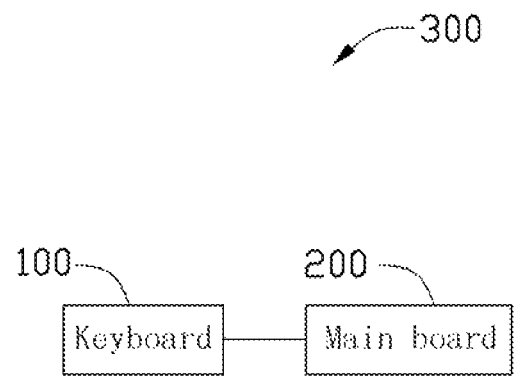
FIG. 1 is a block diagram of an electronic device, according to an exemplary embodiment.

FIG. 1 shows an electronic device 300, according to an exemplary embodiment. The electronic device 300 can be a personal computer (PC), and includes a keyboard 100 and a main board 200 that can be electrically connected to each other.

Figure 2:
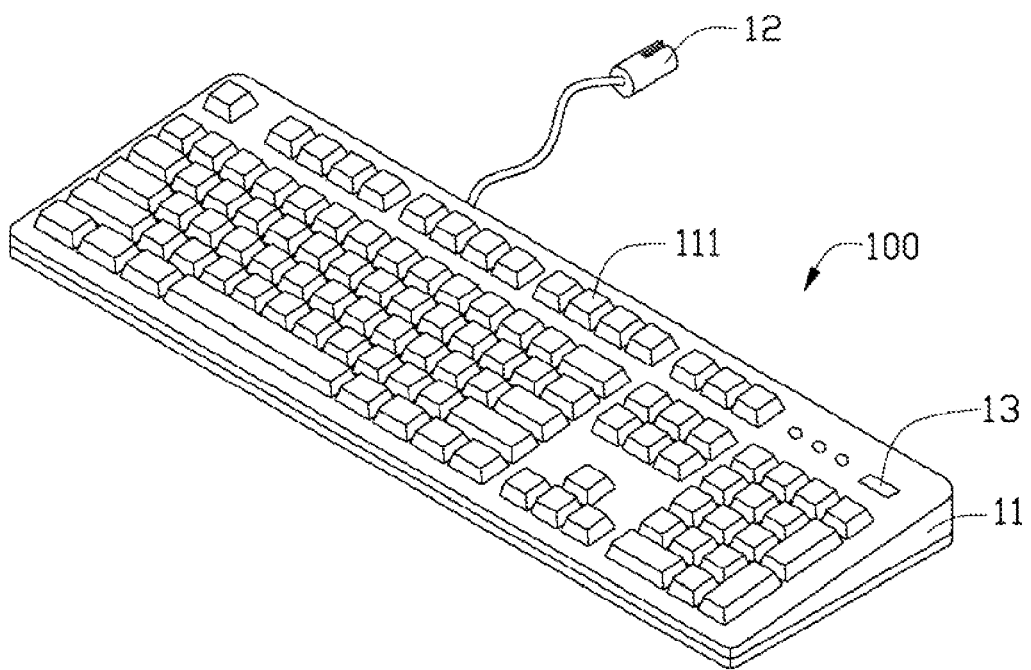
FIG. 2 is a schematic view of a keyboard of the electronic device shown in FIG. 1.

Also referring to FIG. 2, the keyboard 100 includes a main body 11, an interface 12, and a test indicator 13. The main body 11 can be a typical keyboard which includes a plurality of keys 111 for operating the electronic device 300. The test indicator 13 is positioned on an outside surface of the main body 11. Both the main body 11 and the test indicator 13 can be electrically connected to the main board 200 through the interface 12, such that the main board 200 can be operated using the main body 11, and the test indicator 13 can indicate the working status of the main board 200.

Figure 3:
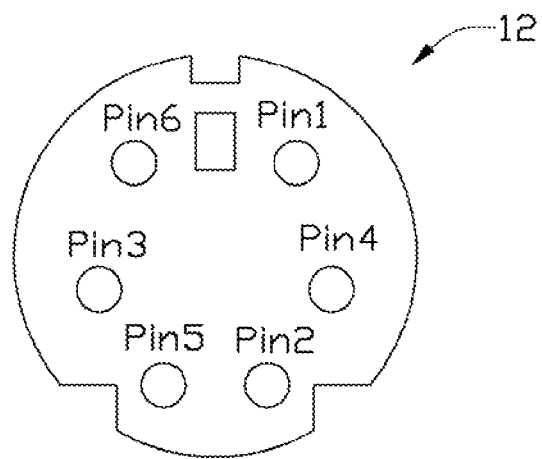
FIG. 3 is a schematic view of the interface of the keyboard shown in FIG. 2.

Also referring to FIG. 3, the interface 12 can be a typical Personal System 2 (PS/2) interface. The interface 12 includes a power supply pin Pin1, a data pin Pin2, a clock pin Pin3, a ground pin Pin4, a first idle pin Pin5, and a second idle pin Pin6. In a typical method for electrically connecting a keyboard with the inner circuits of electronic devices using an PS/2 interface, such as the interface 12, only the power supply pin Pin1, the data pin Pin2, the clock pin Pin3, and the ground pin Pin4 need to be connected to the inner circuits, and the first idle pin Pin5 and the second idle pin Pin6 are unused. Therefore, in this embodiment, the power supply pin Pin1, the data pin Pin2, the clock pin Pin3, and the ground pin Pin4 are electrically connected to the main body 11, and connect the main body 11 to the main board 200 by such means as would be known to those of ordinary skill in the art. The first idle pin Pin5 and the second idle pin Pin6 are electrically connected to the test indicator 13, and are used to electrically connect the test indicator 13 with the main board 200. In this way, the interface 12 does not require additional pins.

Figure 4:
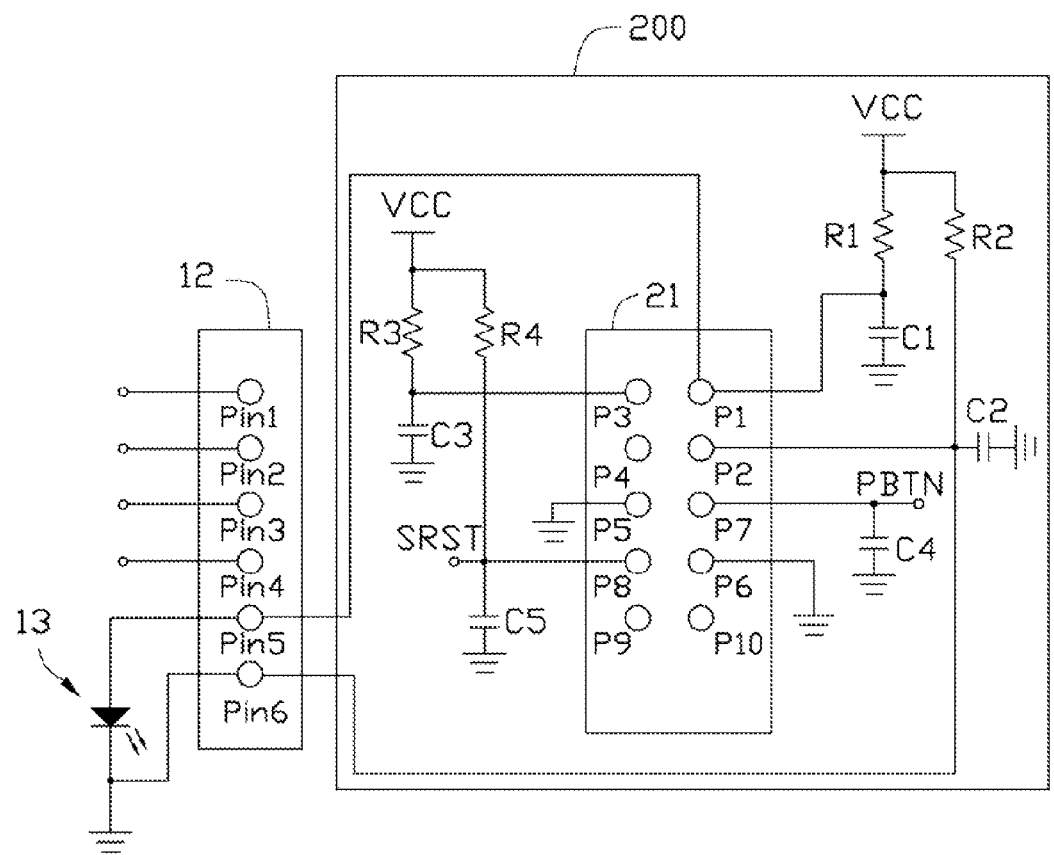
FIG. 4 is a circuit diagram showing an electric connection between the interface shown in FIGS. 2-3 and the main board of the electronic device shown in FIG. 1, wherein the electronic connection is used to test the working status of the power supply for the electronic device.
Figure 5:
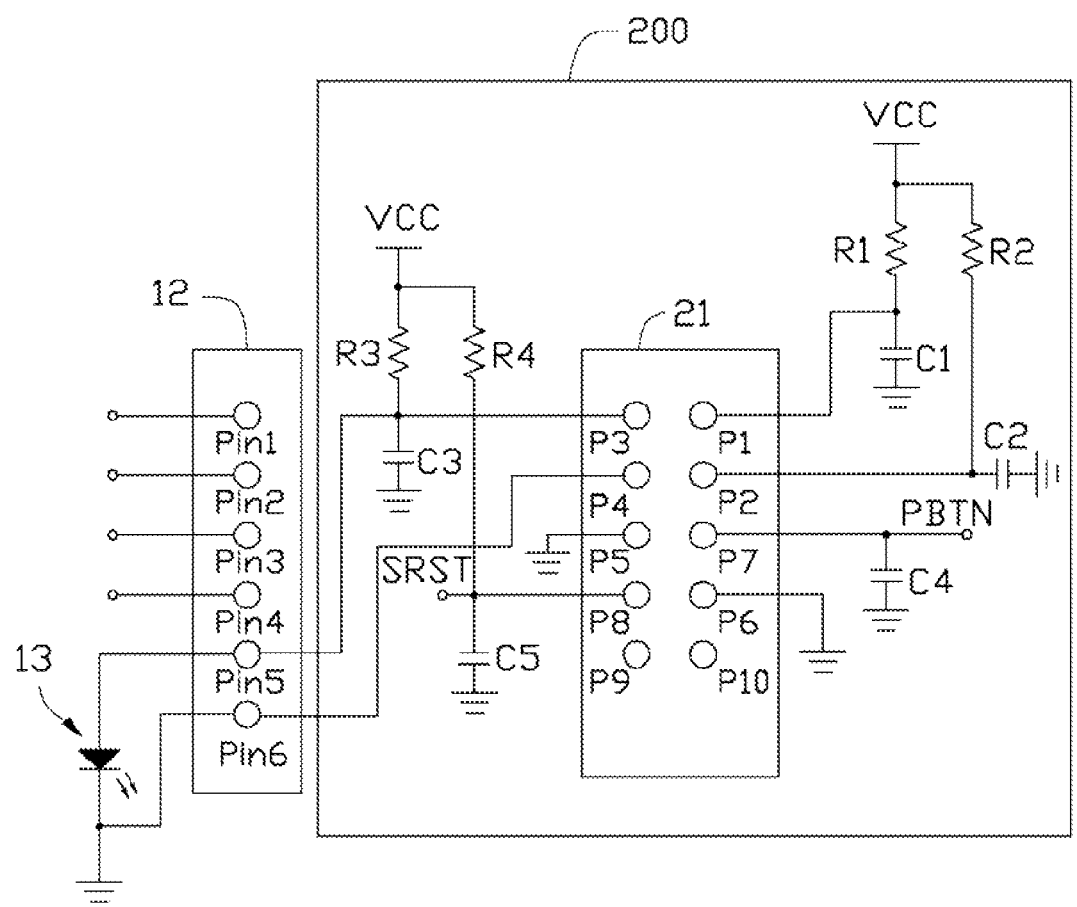
FIG. 5 is a circuit diagram showing another electric connection between the interface shown in FIGS. 2-3 and the main board of the electronic device shown in FIG. 1, wherein the electronic connection is used to test the working status of a hard disk drive (HDD) within the electronic device.

Also referring to FIG. 4 and FIG. 5, the test indicator 13 can be a light emitting diode (LED). The first idle pin Pin5 is electrically connected to an anode of the test indicator 13, and the second idle pin Pin6 is electrically connected to a cathode of the test indicator 13. Both the second idle pin Pin6 and the cathode of the test indicator 13 are grounded.

The main board 200 includes a test connecting module 21, a power supply VCC, at least four resistors R1-R4, and at least five capacitors C1-C5. The test connecting module 21 includes a power supply indicator positive pin P1, a power supply indicator negative pin P2, a hard disk drive (HDD) indicator positive pin P3, an HDD indicator negative pin P4, a first ground pin P5, a second ground pin P6, a power supply activating pin P7, a reset pin P8, and two standby pins P9, P10. The power supply indicator positive pin P1 is electrically connected to the power supply VCC through the resistor R1, and is also electrically connected to ground through the capacitor C1. The power supply indicator negative pin P2 is electrically connected to the power supply VCC through the resistor R2, and is also electrically connected to ground through the capacitor C2. The HDD indicator positive pin P3 is electrically connected to the power supply VCC through the resistor R3, and is also electrically connected to ground through the capacitor C3. Both the first ground pin P5 and the second ground pin P6 are grounded. The power supply activating pin P7 is connected to ground through the capacitor C4. The reset pin P8 is electrically connected to the power supply VCC through the resistor R4, and is also electrically connected to ground through the capacitor C5. Furthermore, the power supply activating pin P7 can receive an activating signal PBTN for the activation of the power supply VCC. The reset pin P8 can receive a reset signal SRST for resetting the main board 200.

When the interface 12 is electrically connected to the main board 200, the main body 11 is electrically connected to the main board 200 through the power supply pin Pin1, the data pin Pin2, the clock pin Pin3, and the ground pin Pin4, by such means as would be known to those of ordinary skill in the art, such that the main board 200 can be manually operated using the main body 11. Furthermore, the test indicator 13 is electrically connected to the main board 200 to indicate working statuses of the electronic device 300.

In this embodiment, the test indicator 13 can be used to indicate at least the presence of the power supply, and the working status of the HDD of the electronic device 300 through the main board 200. Referring to FIG. 4, when the status of the power supply is tested, the first idle pin Pin5 is electrically connected to the power supply indicator positive pin P1, and the second idle pin Pin6 is electrically connected to the power supply indicator positive pin P2. The activating signal PBTN activates the power supply VCC. If the power supply VCC is working normally, the power supply VCC can provide a voltage to the first idle pin Pin5 through the resistor R1 and the power supply indicator positive pin P1. The voltage applied on the first idle pin Pin5 is further applied to the anode of the test indicator 13 so illuminating the test indicator 13. The test indicator 13 emitting light indicates that the power supply VCC is working normally. When the power supply VCC is not present, it is unable to provide the voltage for illuminating the test indicator through the first idle pin Pin5.

Referring to FIG. 5, when the working status of the HDD of the electronic device 300 that is electrically connected to the main board 200 is tested, the first idle pin Pin5 is electrically connected to the HDD indicator positive pin P3, and the second idle pin Pin6 is electrically connected to the HDD indicator positive pin P4. The activating signal PBTN activates the power supply VCC. If the HDD is working normally, the HDD indicator positive pin P3 can provide a voltage to the first idle pin Pin5. The voltage applied to the first idle pin Pin5 goes on to the anode of the test indicator 13 and illuminates the test indicator 13, indicating that the HDD is working normally. When the HDD is not working normally, the HDD indicator positive pin P3 does not provide a voltage through the first idle pin Pin5, and the test indicator 13 does not light up.

In the present disclosure, the interface 12 can simultaneously electrically connect both the main body 11 and the test indicator 13 to the main board 200, without using more pins than that are present in a typical PS/2 interface. The test indicator 13 mounted on the main body 11 can indicate the status of the power supply and of the HDD within the electronic device 300. Despite the isolation of the main board 200 in a closed test box (not shown) for quality testing, the keyboard 100 can be positioned outside the test box, and the test indicator 13 can visibly reveal the status of the relevant items within the electronic device 300.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A keyboard for an electronic device, comprising:
a main body comprising a plurality of keys;
a test indicator positioned on an outside surface of the main body, the test indicator comprising an anode and a cathode; and
an interface electrically connected to both the main body and the test indicator; the interface comprising a first idle pin and a second idle pin;
wherein the main body is electrically connected to a main board of the electronic device through the interface, such that the electronic device can be operated using the plurality of keys of the main body, and the anode and the cathode of the test indicator are electrically connected to the main board through the first idle pin and the second idle pin, respectively; when a power supply of the electronic device works normally, the power supply provides a voltage to the first idle pin through the main board, and the test indicator is switched on by the voltage and emits light to indicate that the power supply works normally.

2. The keyboard as claimed in claim 1, wherein the interface is a Personal System 2(PS/2) interface and further includes a power supply pin, a data pin, a clock pin, and a ground pin; the main body electrically connected to the main board through the power supply pin, the data pin, the clock pin, and the ground pin.

3. The keyboard as claimed in claim 1, wherein the test indicator is a light emitting diode (LED).

4. The keyboard as claimed in claim 2, wherein when a hard disk drive (HDD) of the electronic device that is electrically connected to the main board works normally, the main board provides a voltage to the first idle pin, and the test indicator is switched on by the voltage and emits light to indicate that the HDD works normally.

5. An electronic device, comprising:
a main board comprising a power supply; and
a keyboard electrically connected to the main board, the keyboard including a main body, a test indicator, and an interface; wherein the main body comprises a plurality of keys; the test indicator comprises an anode and a cathode, the interface comprises a first idle pin and a second idle pin; the main body is electrically connected to the main board through the interface, such that the electronic device can be operated using the plurality of keys of the main body, and the anode and the cathode of the test indicator are electrically connected to the main board through the first idle pin and the second idle pin, respectively; when the power supply works normally, the power supply provides a voltage to the first idle pin through the main board, and the test indicator is switched on by the voltage and emits light to indicate that the power supply works normally.

6. The electronic device as claimed in claim 5, wherein the interface is a Personal System 2 (PS/2) interface and further includes a power supply pin, a data pin, a clock pin, a ground pin, a first idle pin, and a second idle pin; the main body electrically connected to the main board through the power supply pin, the data pin, the clock pin, and the ground pin.

7. The electronic device as claimed in claim 5, wherein the test indicator is a light emitting diode (LED).

8. The electronic device as claimed in claim 6, wherein the main board further includes a test connecting module, a plurality of resistors, and a plurality of capacitors; the test connecting module including a power supply indicator positive pin and a power supply indicator negative pin, the power supply indicator positive pin electrically connected to the power supply through a first resistor, and also electrically connected to a ground through a first capacitor; the power supply indicator negative pin electrically connected to the power supply through a second resistor, and also electrically connected to a ground through a second capacitor.

9. The electronic device as claimed in claim 8, wherein the first idle pin and the second idle pin are respectively electrically connected to the power supply indicator positive pin and the power supply indicator positive pin.

10. The electronic device as claimed in claim 8, wherein the main board further includes a hard disk drive (HDD) indicator positive pin and an HDD indicator negative pin, the HDD indicator positive pin electrically connected to the power supply through a third resistor, and also electrically connected to a ground through a third capacitor.

11. The electronic device as claimed in claim 10, further comprising an HDD electrically connected to the main board; when the first idle pin and the second idle pin are respectively electrically connected to the HDD indicator positive pin and the HDD indicator positive pin, and the HDD works normally, the main board provides a voltage to the first idle pin, and the test indicator is switched on by the voltage and emits light to indicate that the HDD works normally.

12. The electronic device as claimed in claim 8, wherein the connecting module further includes a first ground pin and a second ground pin, both the first ground pin and the second ground pin grounded.

13. The electronic device as claimed in claim 8, wherein the connecting module further includes a power supply activating pin for receiving an activating signal for activating the power supply.

14. The electronic device as claimed in claim 8, wherein the connecting module further includes a reset pin for receiving a reset signal for resetting the main board.

* * * * *